(12) United States Patent
Zhu et al.

(10) Patent No.: US 9,955,386 B2
(45) Date of Patent: Apr. 24, 2018

(54) SWITCHOVER SERVICE FOR NETWORK SELECTION FALLBACK

(71) Applicant: Cellco Partnership, Basking Ridge, NJ (US)

(72) Inventors: Lily Zhu, Parsippany, NJ (US); Andrew E. Youtz, Princeton, NJ (US); Christopher M. Schmidt, Branchburg, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 14/190,736

(22) Filed: Feb. 26, 2014

(65) Prior Publication Data
US 2015/0245267 A1    Aug. 27, 2015

(51) Int. Cl.
*H04W 36/00* (2009.01)
*H04W 88/06* (2009.01)
*H04W 36/08* (2009.01)
*H04W 48/16* (2009.01)

(52) U.S. Cl.
CPC ... *H04W 36/0022* (2013.01); *H04W 36/0055* (2013.01); *H04W 36/0061* (2013.01); *H04W 88/06* (2013.01); *H04W 36/08* (2013.01); *H04W 48/16* (2013.01)

(58) Field of Classification Search
CPC ....... H04W 4/005; H04W 4/08; H04W 24/10; H04W 36/0061; H04W 48/16; H04W 36/38; H04W 88/06; H04W 8/22; H04W 36/00; H04W 36/0055; H04W 36/08; H04W 48/18; H04W 74/00; H04W 76/02; H04W 4/008; H04W 4/006; H04W 28/0215; H04W 8/005; H04W 92/18; H04W 60/06; H04W 76/04; H04W 84/18; H04W 88/04; H04W 8/06
See application file for complete search history.

(56) References Cited

U.S. PATENT DOCUMENTS 5,915,214 A * 6/1999 Reece .................. H04M 15/49
379/114.01
7,346,348 B1 * 3/2008 Gazzard .................. H04W 8/06
370/315

(Continued)

OTHER PUBLICATIONS

ETSI TS 136 331 V9.0.0 (Oct. 2009) LTE; Evolved Universal Terrestrial Radio Access (E-UTRA); Radio Resource COntrol (RRC) Protocol specification ETSI V9.0.0 p. 112.*

*Primary Examiner* — Olumide T Ajibade Akonai

(57) ABSTRACT

A method, a device, and a non-transitory storage medium having instructions to receive channel information from a node of a first network, wherein the channel information indicates a channel to use to access a second network when a switchover is invoked, wherein the first network and the second network operate according to different communicative standards; store the channel information; attempt to establish a session with another device via the first network; determine whether an establishment of the session via the first network is successful; and invoke the switchover, wherein the switchover includes using the channel information to attempt to establish a same session via the second network, in response to a determination that the establishment of the session via the first network failed.

20 Claims, 6 Drawing Sheets

(56) References Cited

U.S. PATENT DOCUMENTS

| | | | | |
|---|---|---|---|---|
| 8,428,044 | B2* | 4/2013 | Kubo | H04W 8/183 370/350 |
| 8,948,802 | B1* | 2/2015 | Singh | H04W 64/00 455/513 |
| 2003/0148786 | A1* | 8/2003 | Cooper | H04W 48/18 455/552.1 |
| 2005/0111409 | A1* | 5/2005 | Spear | H04W 36/12 370/331 |
| 2010/0017861 | A1* | 1/2010 | Krishnaswamy | H04W 48/18 726/7 |
| 2010/0195643 | A1* | 8/2010 | Kodali | H04W 48/18 370/352 |
| 2010/0304737 | A1* | 12/2010 | Jain et al. | 455/426.1 |
| 2013/0203410 | A1* | 8/2013 | Gandhi et al. | 455/434 |
| 2013/0259006 | A1* | 10/2013 | Khan | H04W 72/02 370/335 |
| 2013/0303164 | A1* | 11/2013 | Seo | H04W 76/027 455/435.1 |
| 2013/0303176 | A1* | 11/2013 | Martin | H04W 76/027 455/450 |
| 2013/0308481 | A1* | 11/2013 | Kazmi | H04W 24/02 370/252 |
| 2013/0344910 | A1* | 12/2013 | Xing | H04W 68/12 455/515 |
| 2014/0080479 | A1* | 3/2014 | Vangala | H04W 76/028 455/424 |
| 2015/0009813 | A1* | 1/2015 | Nguyen | H04W 4/005 370/230 |

* cited by examiner

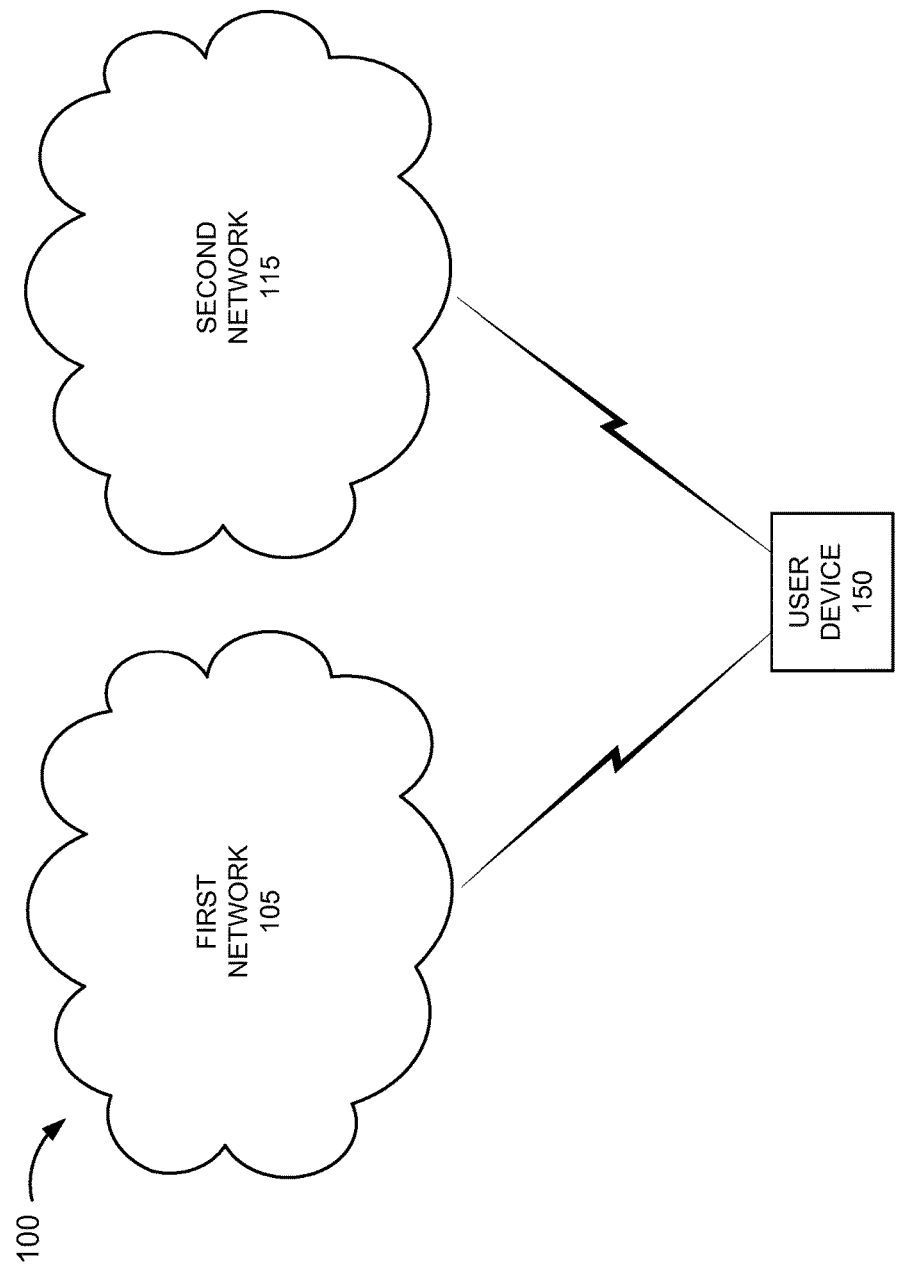

SWITCHOVER SERVICE FOR NETWORK SELECTION FALLBACK

BACKGROUND

Multimode mobile devices allow users the benefit of use of multiple wireless access technologies. Depending on the type of multimode mobile device (e.g., multiple wireless technologies), the multimode mobile device may operate in a single mode at one time or may operate in multiple modes simultaneously. The operation of the multimode mobile device in the single mode state may or may not include the scanning or monitoring of another mode/technology.

BRIEF DESCRIPTION OF THE DRAWINGS

FIG. 1 is a diagram illustrating an exemplary environment in which exemplary embodiments of a switchover service may be implemented;

DETAILED DESCRIPTION OF PREFERRED EMBODIMENTS

Figure 2A:
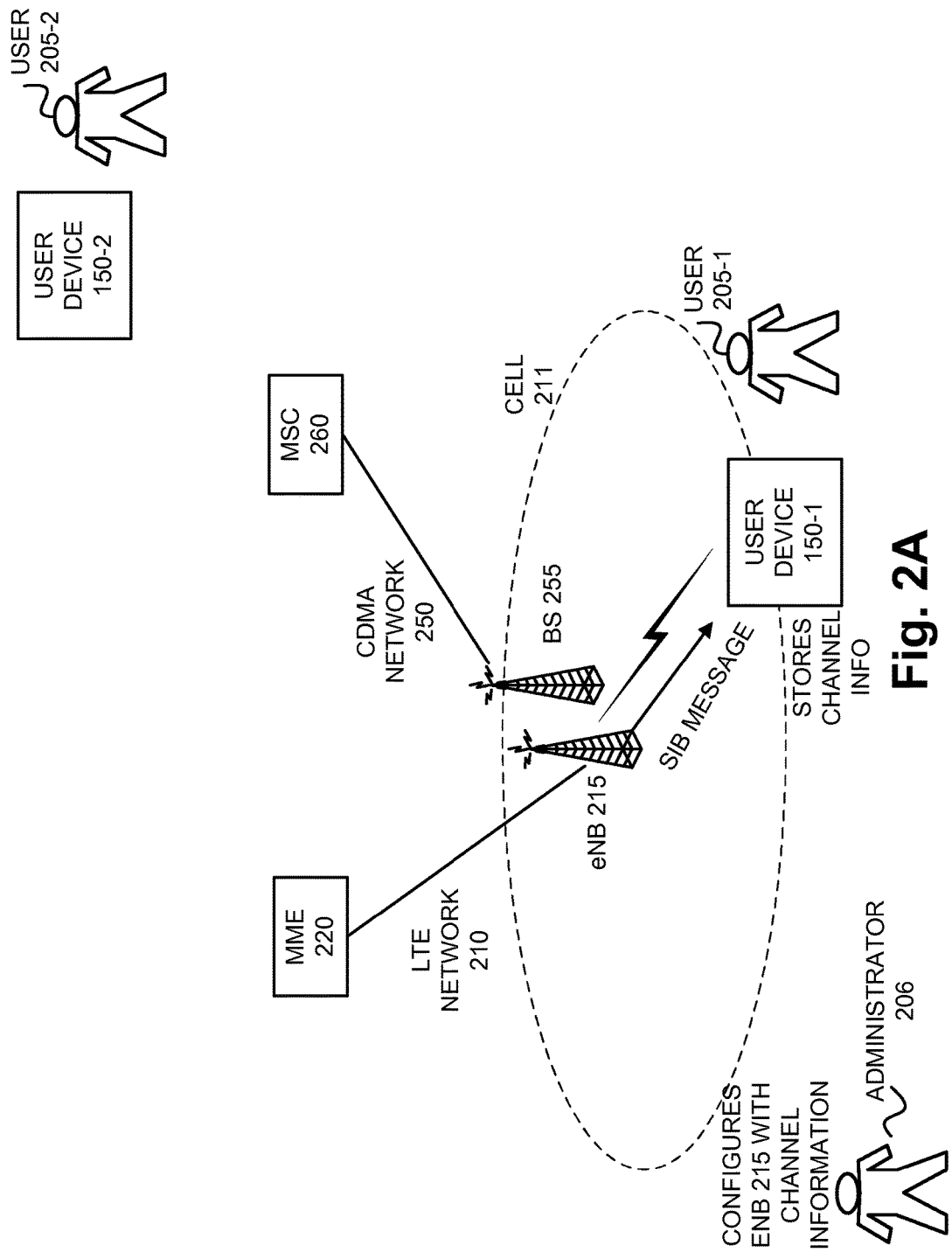
FIGS. 2A-2C are diagrams that illustrate exemplary processes pertaining to the switchover service.

The following detailed description refers to the accompanying drawings. The same reference numbers in different drawings may identify the same or similar elements. Also, the following detailed description does not limit the invention.

A user may experience latency when a multimode mobile device that operates in a single mode at one time switches from one mode to another mode. For example, consider a multimode mobile device that includes Long Term Evolution (LTE) and Code Division Multiple Access (CDMA) communicative capabilities. The user may initiate a Voice-over-Internet Protocol (VoIP) call via an LTE network. Subsequently, the call set-up fails. In response and to minimize the effect of call setup failure to the end user, the multimode mobile device invokes a silent redial process which includes switching to a CDMA network and automatically redialing the same call on behalf of the user. However, the multimode mobile device is "cold" in CDMA (e.g., not registered in a CDMA network since power-up) and needs to scan and acquire the underlying CDMA network, which involves scanning of the channels. For example, the multimode mobile device may search a list (e.g., a preferred roaming list (PRL), etc.), acquire the underlying CDMA network, sync and update overhead messages, and perform CDMA registration and call setup. By virtue of the amount of time that elapses, the user may abandon the initiation of the call (e.g. by pressing an END button) before the completion of the silent redial process. As an example, the call setup failure via the LTE network and the silent redial process may take 30-90 seconds or more. As a result, the user may not benefit from the multimode capabilities of the mobile device in the silent redial scenario.

According to the exemplary scenario explained above, System Information Block (SIB) messages in the LTE standard can carry information for use by a user equipment (UE). For example, the information can assist the UE to access a cell, perform cell re-selection, and include parameters related to INTRA-frequency, INTER-frequency, and INTER-RAT cell selections. More particularly, a SIB Type 8 message includes cell re-selection information for CDMA 2000. The cell re-selection information may include a list of CDMA 2000 neighboring cells, a list of CDMA2000 frequency bands, etc., as set forth in the LTE standard. However, in contrast to the above-mentioned scenario, the 1×RTT parameters in the SIB Type 8 message are created in the 3GPP standard for the UE to use for traditional circuit-switched fall back (CSFB)-based SeRvice and Voice Call Continuity (SRVCC), not for silent redial.

According to an exemplary embodiment, a wireless node transmits a channel list to a multimode mobile device, which is stored by the multimode mobile device and subsequently used by the multimode mobile device when switching between one communicative mode to another. For example, referring back to the exemplary scenario, an enhanced Node B (eNB) may transmit band class, frequency and other cell acquisition information for CDMA 2000 as part of a SIB Type 8 message to the multimode mobile device. This may occur, for example, during initial connection setup between the eNB and the multimode mobile device. The multimode mobile device stores the cell acquisition information. Upon invocation of the silent redial process, the multimode mobile device uses the cell acquisition information, which in turn, may significantly reduce the latency for establishing the call via the CDMA network.

FIG. 1 is a diagram illustrating an exemplary environment 100 in which exemplary embodiments of a switchover service may be implemented. As illustrated, environment 100 includes a first network 105 and a second network 115. As further illustrated, environment 100 includes a user device 150.

Environment 100 may be implemented to include wireless connections between user device 150 and networks 105 and 115. A connection may be direct or indirect and may involve an intermediary device and/or an intermediary network not illustrated in FIG. 1. Additionally, the number and the arrangement of connections between user device 150 and networks 105 and 115 are exemplary.

A device (e.g., user device 150) may be implemented according to one or multiple network architectures (e.g., a client device, a server device, a peer device, a proxy device, and/or a cloud device). Also, according to other embodiments, one or more functions and/or processes described as being performed by a particular device may be performed by a different device, or some combination of devices.

First network 105 and second network 115 may share a common service provider. Alternatively, first network 105 and second network 115 may each be associated with different service providers.

First network 105 includes a wireless network that provides access to a service or an asset. First network 105 may be implemented using various wireless architectures and/or technologies, such as a cellular network, a non-cellular network, a $3^{rd}$ Generation (3G) network, a $4^{th}$ Generation (4G) network, etc. By way of further example, first network 105 may be implemented to include an LTE network, a Universal Mobile Telecommunications System (UMTS) network, a Global System for Mobile Communications (GSM) network, a Wideband Code Division Multiple Access (WCDMA) network, an Ultra Mobile Broadband (UMB) network, a High-Speed Packet Access (HSPA) network, a Worldwide Interoperability for Microwave Access (WiMAX) network, an Evolution Data Optimized (EV-DO)

network, and/or another type of wireless network (e.g., an LTE Advanced network, or future generation wireless network architecture).

Given the wide variety of wireless networks that may be implemented in various embodiments, first network 105 may include various types of network devices, such as a base station, a base station controller, an eNB, a serving gateway (SGW), a packet data network gateway (PGW), a mobility management entity (MME), a home node B, a wireless relay node, a pico base station, a base transceiver station, a repeater, a user device gateway, a radio node, an anchor point, a wireless router, etc. A network device may support one or multiple access and/or wireless technologies. First network 105 may include other network devices that pertain to billing, security (e.g., a firewall, etc.), providing a service or an asset, providing access to another network, etc.

According to an exemplary embodiment, a network device of first network 105 stores channel information pertaining to second network 115. For example, a base station or other suitable wireless node of first network 105 stores the channel information. The channel information may indicate one or multiple channels. For example, the channel information may indicate a frequency band and a channel number associated with a channel. As previously described, the channel information pertains to a channel that may be acquired by user device 150 for use. For example, the channel information may indicate a channel, in view of the geographic area in which user device 150 resides relative to the network device of first network 105. User device 150 should be able to connect to a network device of second network 115 via the channel.

Second network 115 includes a wireless network that provides access to a service or an asset. Similar to first network 105, second network 115 may be implemented using various wireless architectures and/or technologies and includes various types of network devices.

According to an exemplary embodiment, first network 105 and second network 115 include different types of wireless access technologies. For example, first network 105 may include an LTE network and second network 115 may include a wireless network other than an LTE network. Additionally, although environment 100 illustrates two networks (i.e., first network 105 and second network 115), according to other embodiments, environment 100 may include an additional network (e.g., a third network, a fourth network, etc.). The additional network may be of a third type or may be of a type that is redundant relative to first network 105 or second network 115. The use of a third network, a fourth network, etc., may rest on the multimode capabilities of user device 150.

User device 150 includes an end user device with wireless communicative capabilities. User device 150 may be a mobile device. User device 150 may be implemented to include a smartphone, a tablet device, a netbook, a vehicular communication system within a vehicle (e.g., a car, a truck, etc.), a computer, a smart television, or some other type of suitable wireless communicative device. According to an exemplary embodiment, user device 150 is capable of connecting to first network 105 and second network 115. For example, user device 150 includes multiple communication interfaces. The communication interfaces operate according to at least two different communication standards.

Figure 2B:
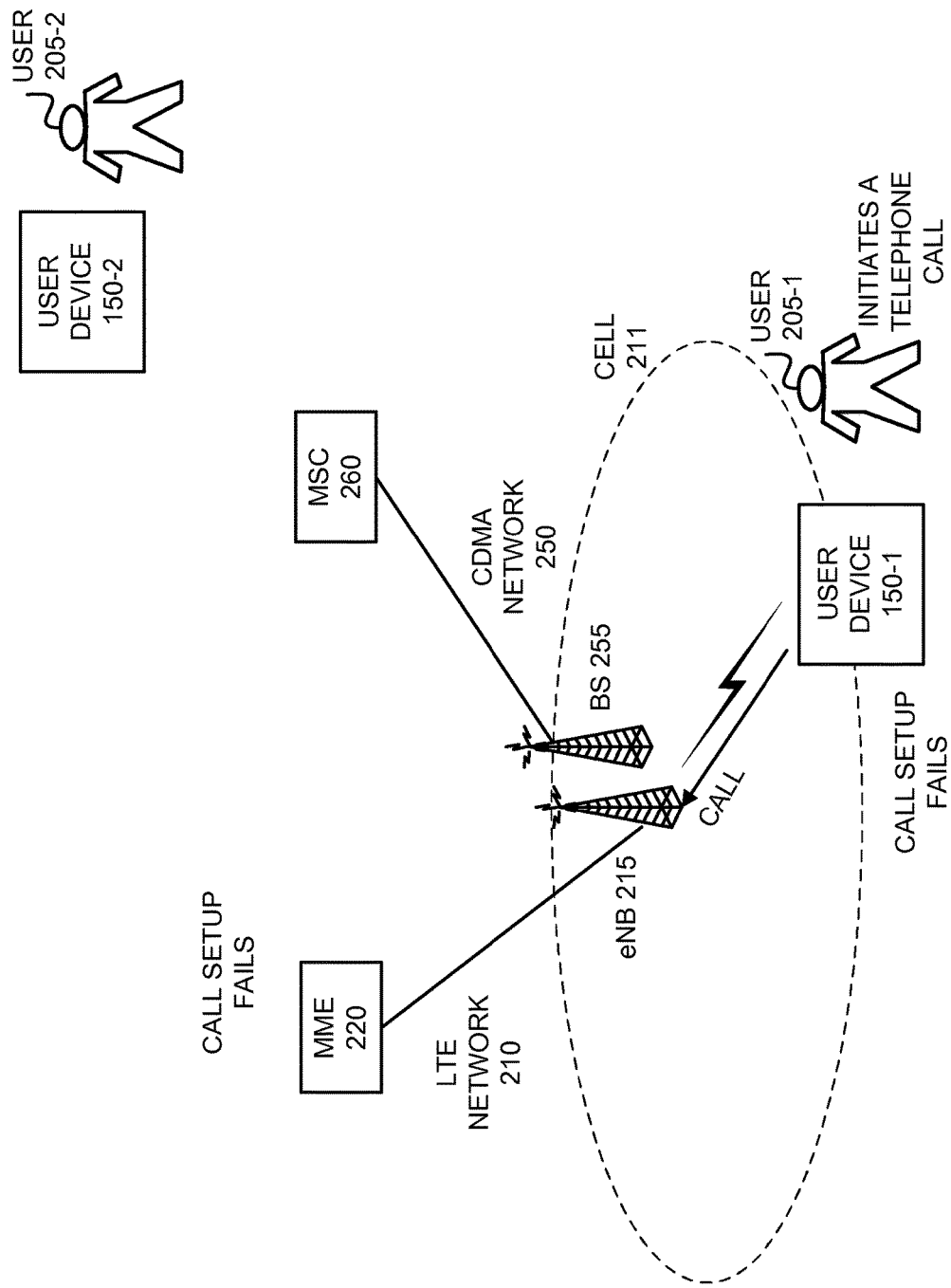
Figure 2C:
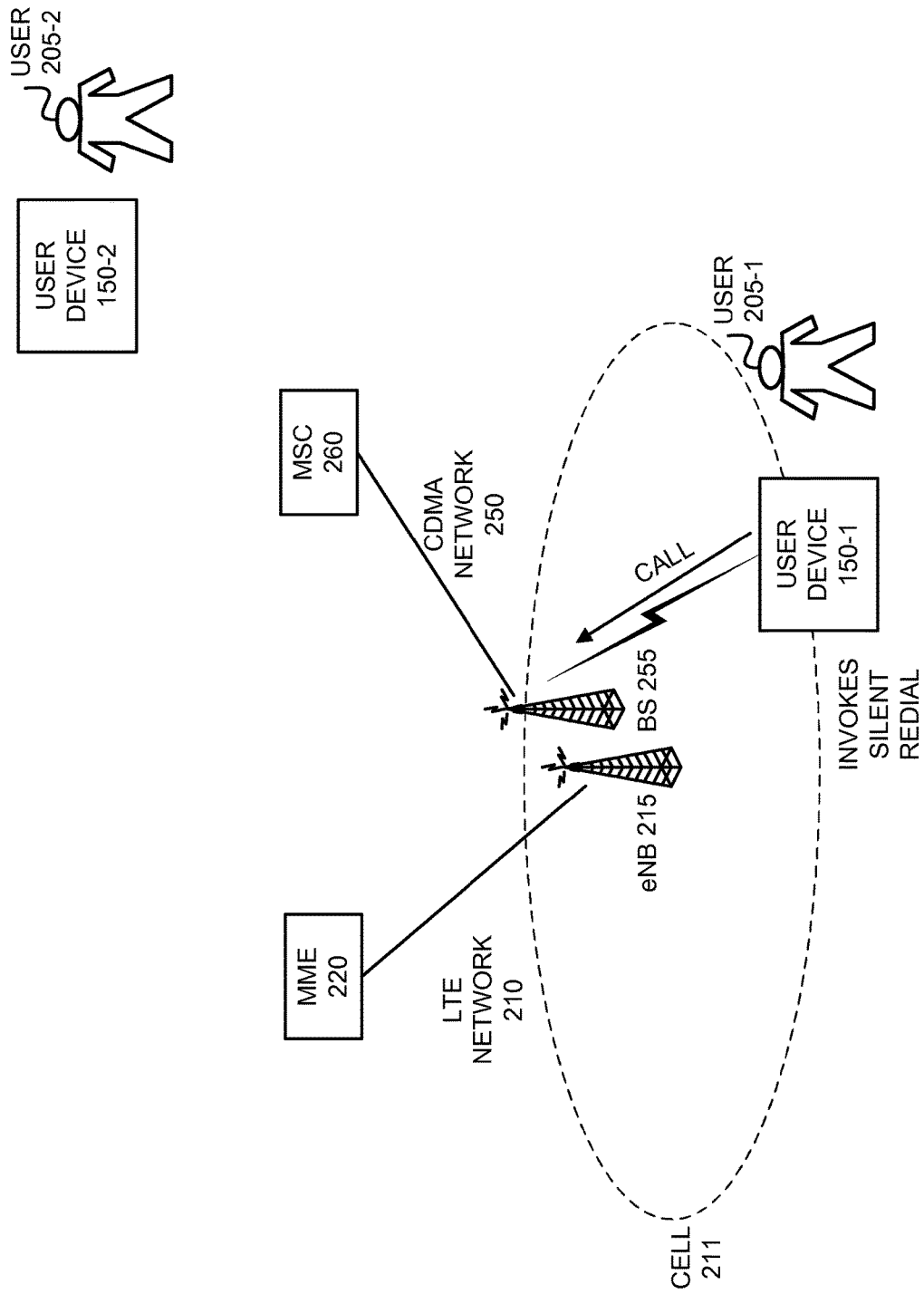

An exemplary embodiment of the switchover service is described further below. FIGS. 2A-2C are diagrams illustrating exemplary implementations of exemplary embodiments of the switchover service. Referring to FIG. 2A, an LTE network 210 includes an eNB 215 and an MME 220. A CDMA network 250 includes a base station 255 and a mobile switching center 260. It may be assumed, although not illustrated, that other network elements (e.g., a base station controller, a packet data network gateway (PGW), etc.) exist in LTE network 210 and CDMA 250, respectively, but have been omitted for purposes of brevity. A cell 211 indicates a geographic area serviced by eNB 215 and BS 255. As illustrated, eNB 215 and base station 255 resides within cell 211. In this regard, eNB 215 and BS 255 may be considered co-located. As illustrated, a user device 150-1 associated with a user 205-1 may communicate with a user device 150-2 associated with a user 205-2 via LTE network 210 or CDMA network 250. It may be assumed that user device 150-1 has multimode capabilities that include LTE and CDMA wireless technologies. Additionally, although not illustrated, an intermediary network element, a network, etc., may exist between MME 220 and user device 150-2 and/or between a mobile switching center (MSC) 260 and user device 150-2.

According to an exemplary implementation, eNB 215 is configured to store and transmit (e.g., broadcast) channel information pertaining to CDMA network 250. For example, assume that an administrator 206 configures eNB 215. According to other implementations, administrator 206 may configure a different wireless node (not illustrated) of LTE network 210 (e.g., a home eNB, a gateway device, etc.). According to an exemplary implementation, the channel information includes channel information pertaining to base station 255 of CDMA network 250. For example, the channel information may indicate a frequency band and a channel number pertaining to a channel.

As illustrated in FIG. 2A, eNB 215 broadcasts the channel information in a SIB message (e.g., Type 8). ENB 215 may broadcast the SIB message periodically. User device 150-1 stores the channel information. For example, a modem or other component of user device 150-1 may store the channel information in a list (e.g., a most recently used (MRU) list or other type of list). In the event that user device 150-1 stores multiple types of lists (e.g., a public land mobile network (PLMN) list, a PRL list, etc.), user device 150-1 may store the channel information in a list that would be accessed first when a switchover process (e.g., a silent redial process) is performed, or store the channel information with a priority designed such that the freshness of the other information stored in user device 150-1 (e.g., the MRU) can be evaluated and used together with the SIB8 broadcast, as described further below. For example, user device 150-1 may add the channel information to a beginning of an MRU list. According to this exemplary scenario, assume user device 150-1 establishes a connection with LTE 210. Although not illustrated, user device 150-1 may register with CDMA network 250.

Referring to FIG. 2B, subsequent to connection with LTE 210, assume user 205-1 wishes to place a telephone call to user 205-2 via LTE network 210. Although not illustrated, user device 205-2 may be connected to a network. After dialing a telephone number, user 205-1 presses a send button via user device 150-1. However, according to this example, assume the call setup fails. The failure may be attributed to any reason.

Referring to FIG. 2C, in response to this failure, user device 150-1 may invoke a silent redial process. The silent redial process is invoked automatically. The silent redial process causes user device 150-1 to retry the call via another network (i.e., a switchover service). According to this exemplary scenario, user device 150-1 attempts to use CDMA network 250 to complete the telephone call. User device 150-1 uses the channel information (e.g., the stored acquisition information) previously stored to establish a connection with CDMA network 250. In view of the stored channel information, the latency attributed to establishing a connection with CDMA network 250 may be minimized. For example, user device 150-1 will not have to scan the channels through multiple lists as part of channel acquisition, or for that matter, even multiple entries of a single list, since the channel information is stored in a particular list and, even further, within a particular portion of the list (e.g., a top of the list). Further, the latency attributed to call establishment (in this case) may be minimized. According to this example, assume that user device 150-1 establishes a connection with CDMA network 250 and successfully establishes a telephone call with user 205-2 via user device 150-2.

Although the above scenario has been explained with respect to particular networks (e.g., LTE and CDMA), message (e.g., SIB type 8), and application (e.g., telephone call), according to other implementations, embodiments of the switchover service may be applied to different types of networks, messages, and applications. For example, in the context of a GSM network, a wireless node (e.g., a base station) may transmit channel information in a system information message (e.g., a broadcast control channel (BCCH)). Alternatively, according to other implementations, the channel information may be transmitted via a proprietary message or via some other suitable message and/or field of a message. Additionally, or alternatively, a user may initiate a web session (e.g., streaming of a movie, etc.) or some other type of network session that fails and causes user device 150 to invoke the switchover service and use the channel information, as described herein.

Figure 3:
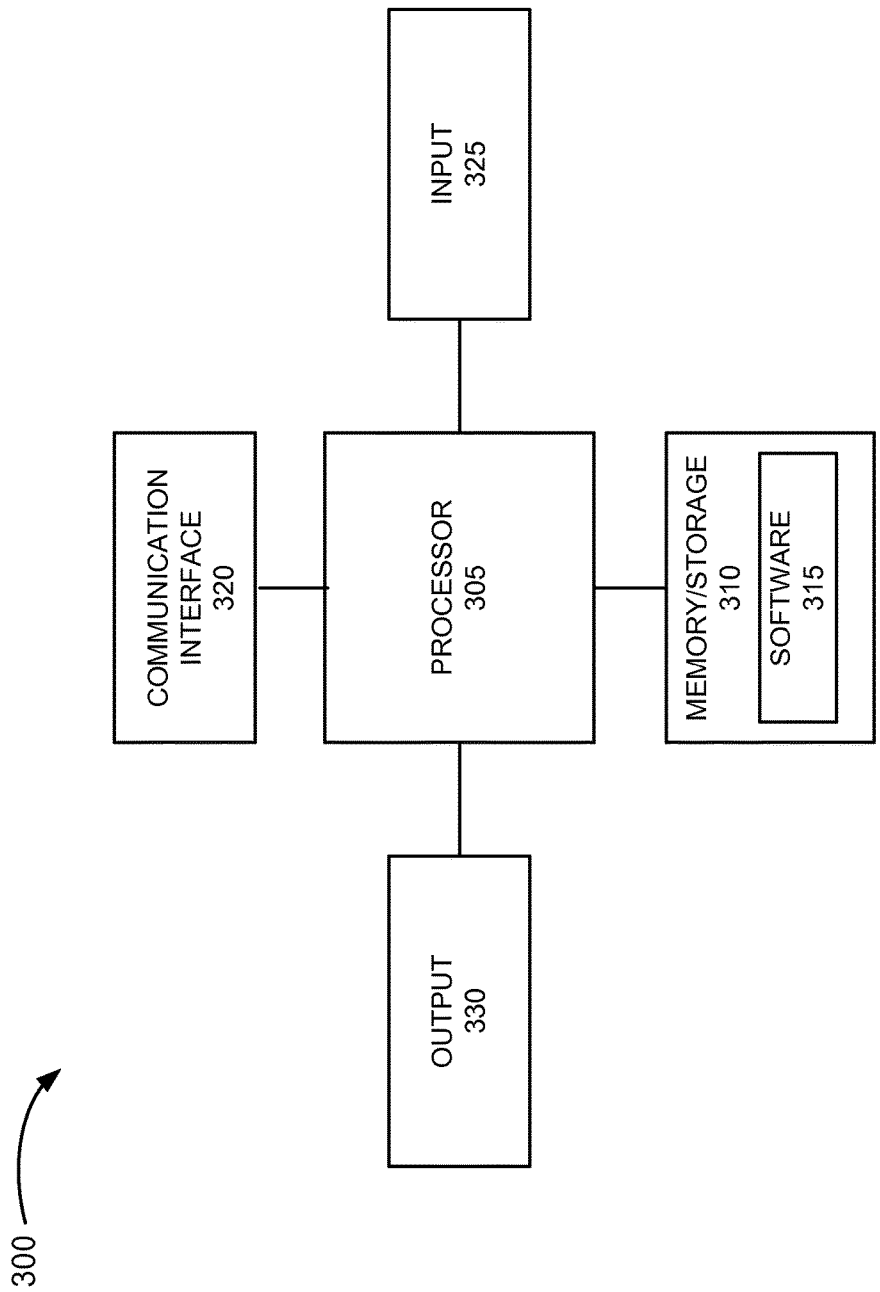
FIG. 3 is a diagram illustrating exemplary components of a device that may correspond to one or more of the devices in the exemplary environment.

FIG. 3 is a diagram illustrating exemplary components of a device 300 that may correspond to one or more of the devices in the environments described herein. For example, device 300 may correspond to network devices of first network 105 and second network 115, user device 150, as well as other network devices described. As illustrated, according to an exemplary embodiment, device 300 includes a processor 305, memory/storage 310 that stores software 315, a communication interface 320, an input 325, and an output 330. According to other embodiments, device 300 may include fewer components, additional components, different components, and/or a different arrangement of components than those illustrated in FIG. 3 and described herein.

Processor 305 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 305 may be implemented as hardware (e.g., a microprocessor, etc.), a combination of hardware and software (e.g., a SoC, an ASIC, etc.), may include one or multiple memories (e.g., cache, etc.), etc.

Processor 305 may control the overall operation or a portion of operation(s) performed by device 300. Processor 305 may perform one or multiple operations based on an operating system and/or various applications or programs (e.g., software 315). Processor 305 may access instructions from memory/storage 310, from other components of device 300, and/or from a source external to device 300 (e.g., a network, another device, etc.).

Memory/storage 310 includes one or multiple memories and/or one or multiple other types of storage mediums. For example, memory/storage 310 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 310 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 310 may include drives for reading from and writing to the storage medium.

Memory/storage 310 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 310 may store data, software, and/or instructions related to the operation of device 300.

Software 315 includes an application or a computer program that provides a function and/or a process. Software 315 may include firmware. For example, with reference to user device 150, software 315 may include an application that, when executed by processor 315, provides the functions as described herein.

Communication interface 320 permits device 300 to communicate with other devices, networks, systems, etc. Communication interface 320 may include one or multiple wireless interfaces and/or wired interfaces. Communication interface 320 may include one or multiple transmitters and receivers or transceivers. Communication interface 320 may operate according to a protocol and a communication standard. As previously described, according to an exemplary embodiment, user device 150 includes multiple communication interfaces 320. The multiple communication interfaces 320 support multiple wireless technologies.

Input 325 permits an input into device 300. For example, input 325 may include a keyboard, a mouse, a display, a touchscreen, a touchless screen, a button, a switch, an input port, speech recognition logic, and/or some other type of visual, auditory, tactile, etc., input component. Output 330 permits an output from device 300. For example, output 330 may include a speaker, a display, a touchscreen, a touchless screen, a light, an output port, and/or some other type of visual, auditory, tactile, etc., output component.

Device 300 may perform a process and/or a function, as described herein, in response to processor 305 executing software 315 stored by memory/storage 310. By way of example, instructions may be read into memory/storage 310 from another memory/storage 310 (not shown) or read from another device (not shown) via communication interface 320. The instructions stored by memory/storage 310 may cause processor 305 to perform a process described herein. Alternatively, for example, according to other implementations, device 300 may perform a process described herein based on the operation of hardware (processor 305, etc.).

Figure 4:
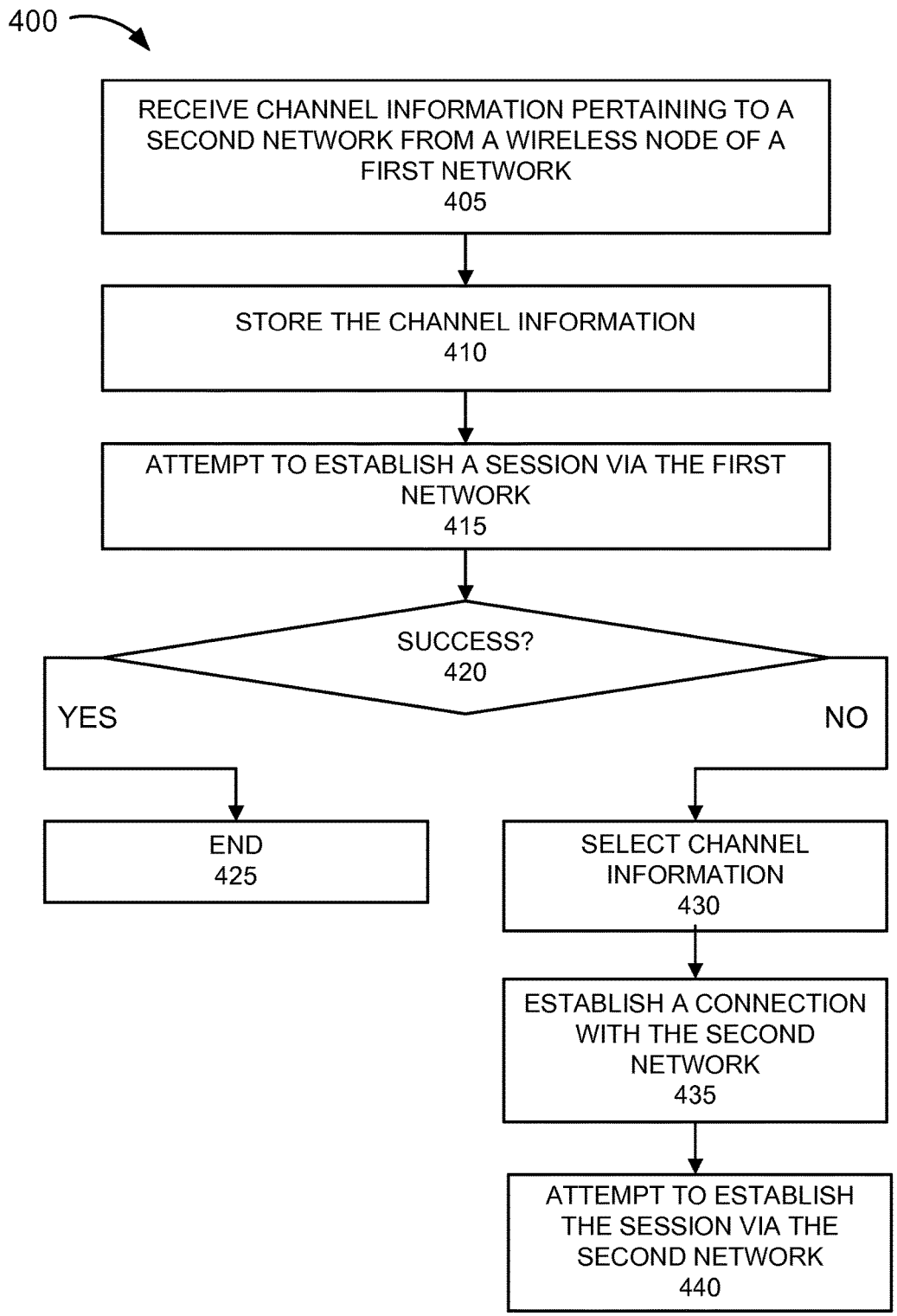
FIG. 4 is a flow diagram that illustrates an exemplary process pertaining to the switchover service.

FIG. 4 is a flow diagram illustrating an exemplary process 400 pertaining to the switchover service. Process 400 is directed to a process previously described above with respect to FIGS. 2A-2C and elsewhere in this description, in which channel information is provided to a user device and used by the user device to perform a switchover process.

According to an exemplary embodiment, the user device is a multimode device and performs the steps described in process 400. For example, processor 305 may execute software 315 to perform the steps described.

Referring to FIG. 4, process 400 may begin with receiving channel information pertaining to a second network from a wireless node of a first network (block 405). For example, a wireless node (e.g., a base station) of a first network (e.g., first network 105 and LTE network 210) transmits channel information to user device 150. The channel information indicates a frequency band and a channel number of a channel for accessing a second network (e.g., second network 115 and CDMA network 250). The channel information may be carried by a system information (SI) message or other suitable message or field of a message. For example, with reference to the LTE network and SIB messages, SIB types 6, 7, or 8 messages may be used. As an example, the SIB8 message may include frequency band, channel number, CDMA cell ID, CDMA system time, and search window. User device 150 may also register with the second network during a power-up procedure.

In block 410, the channel information is stored. For example, user device 150 stores the channel information. By way of further example, user device 150 stores the channel information in a list (e.g., an MRU list, etc.) or other suitable instance in memory (e.g., in terms of form, location, etc.). Additionally, user device 150 may store the channel information at the top of an (existing) list. In this way, the channel search time to access the second network may be significantly reduced.

In block 415, an establishment of a session via the first network is attempted. For example, user device 150 may attempt to establish a session (e.g., a data session, a voice session, etc.) with another device (e.g., a user device, a network device). By way of further example, the session may include a telephone call or a web session.

In block 420, it is determined whether the session is established. For example, user device 150 determines whether an establishment of the session is successful. If it is determined that the session is established (block 420—YES), then process 400 may end (block 425). For example, user device 150 communicates with another user device or network device via the first network in view of the established session.

If it is determined that the session is not established (block 420—NO), then the channel information is selected (block 430). For example, user device 150 retrieves the stored channel information and uses the channel information to establish the session via the second network with the other user device or network device. If the communication interface for the second network is turned off (e.g., in a cold state), user device 150 turns on the communication interface. As previously described, according to an exemplary implementation, the retrieval and use of the channel information may occur during a silent redial process. User device 150 is in a state other than an idle state during the invocation of the switchover/silent redial process.

In block 435, a connection with the second network is established. For example, user device 150 establishes a connection with the second network. In block 440, an establishment of a same session via the second network is attempted. For example, user device 150 establishes the session with the other user device or network device via second network 115.

Although FIG. 4 illustrates an exemplary program support service process 400, according to other embodiments, process 400 may include additional operations, fewer operations, and/or different operations than those illustrated in FIG. 4 and described herein.

The foregoing description of embodiments provides illustration, but is not intended to be exhaustive or to limit the embodiments to the precise form disclosed. Accordingly, modifications to the embodiments described herein may be possible. For example, the channel information may include additional information, such as, information pertaining to monetary costs associated with a channel of the second network, information indicating services or assets available via the second network, a bandwidth supported by the second network, a quality of service supported by the second network, etc. In this regard, the user device may select a channel from the channel information that provides a best-fit in view of the type of session, etc. Additionally, or alternatively, the channel information may pertain to multiple networks. For example, if the user device has multimode capabilities that extend beyond two networks, the channel information may pertain to a second network, a third network, etc.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIG. 4, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processor 305, etc.), or a combination of hardware and software (e.g., software 315). The embodiments have been described without reference to the specific software code since the software code can be designed to implement the embodiments based on the description herein and commercially available software design environments/languages.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Additionally, embodiments described herein may be implemented as a non-transitory storage medium that stores data and/or information, such as instructions, program code, data structures, program modules, an application, etc. A non-transitory storage medium includes one or more of the storage mediums described in relation to memory/storage 310.

No element, act, or instruction described in the present application should be construed as critical or essential to the embodiments described herein unless explicitly described as such.

What is claimed is:

1. A method comprising:
   receiving, by a user device and from a wireless node of a first network, a channel number and a frequency band to use to access a second network when a switchover is subsequently invoked by the user device, wherein the user device is a multimode device that can access, via a first communication interface, the first network of a first communicative standard and access, via a second communication interface, the second network of a second communicative standard that is different from the first communicative standard, and wherein the first network is a Long Term Evolution network and the channel number and the frequency band are carried in a system information block message;
   storing, by the user device, the channel number and the frequency band in a memory location that is first accessed by the user device when the switchover is invoked, and wherein the memory location stores only the channel number and the frequency band;
   attempting to establish, by the user device via the first communication interface, a session with another device via the first network;
   determining, by the user device, whether an establishment of the session via the first network is successful; and
   invoking, by the user device, the switchover, wherein the switchover includes retrieving and using the channel number and the frequency band to attempt to establish a same session via the second network and via the second communication interface, in response to determining that the establishment of the session via the first network failed.

2. The method of claim 1, wherein the session includes a telephone call, and wherein the user device operates in a single mode at one time, and wherein the switchover is a silent redial.

3. The method of claim 1, wherein the storing comprises:
   updating a most recently used list with the channel number and the frequency band, and wherein the channel number and the frequency band are stored at a top of the most recently used list, and wherein the top of the most recently used list corresponds to the memory location.

4. The method of claim 1, wherein the second network is a Code Division Multiple Access (CDMA) network, and the method further comprises:
   establishing a connection and the same session via a wireless node of the second network, wherein the system information block message is one of a type 6 or a type 7, and wherein the wireless node of the first network and the wireless node of the second network are co-located and reside in a same cell.

5. The method of claim 1, wherein the user device is in a state other than an idle state when the switchover is invoked.

6. The method of claim 1, further comprising:
   registering, by the user device, with the second network during a power-up procedure.

7. The method of claim 1, further comprising:
   determining, by the user device, whether the second communication interface is turned on; and
   turning on, by the user device, the second communication interface in response to determining that the second communication interface is turned off.

8. The method of claim 1, wherein the storing comprises:
   selecting a list among multiple lists to store the channel number and the frequency band; and
   selecting a placement in the list to store the channel number and the frequency band, wherein the placement in the list corresponds to the memory location and provides that the user device first accesses the channel number and the frequency band.

9. A user device comprising:
   a first communication interface of a first communicative standard pertaining to a first network, wherein the first network includes a Long Term Evolution network;
   a second communication interface of a second communicative standard pertaining to a second network, wherein the first communicative standard is different from the second communicative standard;
   a memory, wherein the memory stores instructions; and
   a processor, wherein the processor executes the instructions to:
      receive, via the first communication interface, a channel number and a frequency band to use to access the second network when a switchover is subsequently invoked by the user device, wherein the channel number and the frequency band are received in a system information block message;
      store the channel number and the frequency band in a memory location that is first accessed by the user device when the switchover is invoked, and wherein the memory location stores only the channel number and the frequency band;
      attempt to establish, via the first communication interface, a session with another device via the first network;
      determine whether an establishment of the session via the first network is successful; and
      invoke the switchover, in response to a determination that the establishment of the session via the first network failed, wherein the switchover includes retrieving and using the channel number and the frequency band to attempt to establish a same session via the second communication interface and the second network.

10. The user device of claim 9, wherein the processor further executes the instructions to:
    register with the second network during a power-up procedure.

11. The user device of claim 9, wherein, when storing, the processor further executes the instructions to:
    update a list with the channel number and the frequency band, and wherein the channel number and the frequency band are stored at a top of the list, wherein the top of the list corresponds to the memory location.

12. The user device of claim 9, wherein the processor further executes the instructions to:
    establish a connection and the same session via the second network, and wherein the switchover is a silent redial.

13. The user device of claim 9, wherein the session is a web session.

14. The user device of claim 9, wherein
    the user device is in a state other than an idle state when the switchover is invoked.

15. The user device of claim 9, wherein the processor further executes the instructions to:
  register with the second network during power-up, and wherein the second communication interface is turned off at a time when the switchover is invoked.

16. A non-transitory storage medium storing instructions executable by a processor of a multimode computational device to:
  receive, from a node of a first network, a channel number and a frequency band to use to access a second network when a switchover is subsequently invoked, wherein the first network and the second network operate according to different communicative standards, wherein the first network is a Long Term Evolution network and the channel number and the frequency band are received in a system information block message;
  store the channel number and the frequency band in a memory location that is first accessed by the multimode computational device when the switchover is invoked, and wherein the memory location stores only the channel number and the frequency band;
  attempt to establish a session, via a first communication interface of the multimode computational device, with another device via the first network;
  determine whether an establishment of the session via the first network is successful; and
  invoke the switchover, in response to a determination that the establishment of the session via the first network failed, wherein the switchover includes retrieving and using the channel number and the frequency band to attempt to establish a same session via the second network.

17. The non-transitory storage medium of claim 16, wherein the instructions to store the channel number and the frequency band further comprise instructions executable by the processor of the multimode computational device to:
  update a list, of multiple lists stored by the multimode computational device, with the channel number and the frequency band, and wherein the channel number and the frequency band are stored at a top of the list, and the top of the list corresponds to the memory location.

18. The non-transitory storage medium of claim 16, further storing instructions executable by the processor of the multimode computational device to:
  register with the second network during power-up; and
  establish a connection and the same session via the second network subsequent to the switchover.

19. The non-transitory storage medium of claim 16, wherein the multimode computational device is in a state other than an idle state when the switchover is invoked, and wherein the system information block message is a type 8.

20. The non-transitory storage medium of claim 16, wherein the session includes a telephone call, and the second network is a Code Division Multiple Access (CDMA) network, and wherein the system information block message is one of a type 6 or a type 7, and wherein the node of the first network and a node of the second network are co-located and reside in a same cell.

\* \* \* \* \*